(12) United States Patent
Shirai

(10) Patent No.: US 8,499,906 B2
(45) Date of Patent: Aug. 6, 2013

(54) BICYCLE SUSPENSION HAVING STROKE AND DAMPER ADJUSTMENT

(75) Inventor: Toyoto Shirai, Izumi (JP)

(73) Assignee: Shimano Inc., Sakai (JP)

( * ) Notice: Subject to any disclaimer, the term of this patent is extended or adjusted under 35 U.S.C. 154(b) by 458 days.

(21) Appl. No.: 12/559,500

(22) Filed: Sep. 15, 2009

(65) Prior Publication Data

US 2011/0062679 A1 Mar. 17, 2011

(51) Int. Cl.
*F16F 9/48* (2006.01)

(52) U.S. Cl.
USPC ..................................... 188/285; 188/299.1

(58) Field of Classification Search
USPC ............. 188/282.4, 285, 317, 319.1, 319.2, 188/299.1, 300; 280/5.515, 124.101, 124.102, 280/275, 276, 277; 267/64.15, 64.18, 64.22, 267/64.26
See application file for complete search history.

(56) References Cited

U.S. PATENT DOCUMENTS

| 4,609,202 | A  | * | 9/1986  | Miyakoshi et al. | ........... | 280/276 |
| 6,217,049 | B1 | * | 4/2001  | Becker           | ........... | 280/276 |
| 6,767,024 | B1 | * | 7/2004  | Kuo              | ........... | 280/276 |
| 6,786,498 | B1 | * | 9/2004  | Chang            | ........... | 280/275 |
| 7,097,014 | B2 | * | 8/2006  | Huang            | ........... | 188/300 |
| 7,216,881 | B2 | * | 5/2007  | Wesling          | ........... | 280/276 |
| 7,806,022 | B2 | * | 10/2010 | Hara             | ........... | 74/502.2 |
| 7,988,173 | B2 | * | 8/2011  | Morris           | ........... | 280/276 |
| 8,065,932 | B2 | * | 11/2011 | Hara et al.      | ........... | 74/502.2 |
| 2005/0252330 | A1 | * | 11/2005 | Denk         | ........... | 74/502.2 |

FOREIGN PATENT DOCUMENTS

| DE | 19532088 | | 3/1997 |
| EP | 541891 A1 | * | 5/1993 |
| WO | WO 2004104441 A1 | * | 12/2004 |

* cited by examiner

*Primary Examiner* — Bradley King
*Assistant Examiner* — Nicholas J Lane
(74) *Attorney, Agent, or Firm* — Ditthavong Mori & Steiner, P.C.

(57) ABSTRACT

A bicycle suspension includes a stroke adjustment unit, a suspension damper, a damper adjustment unit, and a control mechanism. The stroke adjustment unit is configured to adjust a stroke of the bicycle suspension, which is configured to expand and contract within the stroke. The suspension damper is configured to apply damping force to the bicycle suspension. The damper adjustment unit is configured to adjust the damping force applied by the suspension damper. The control mechanism operatively couples the stroke adjustment unit to the damper adjustment unit and is configured to sequentially adjust the stroke and the damping force.

11 Claims, 11 Drawing Sheets

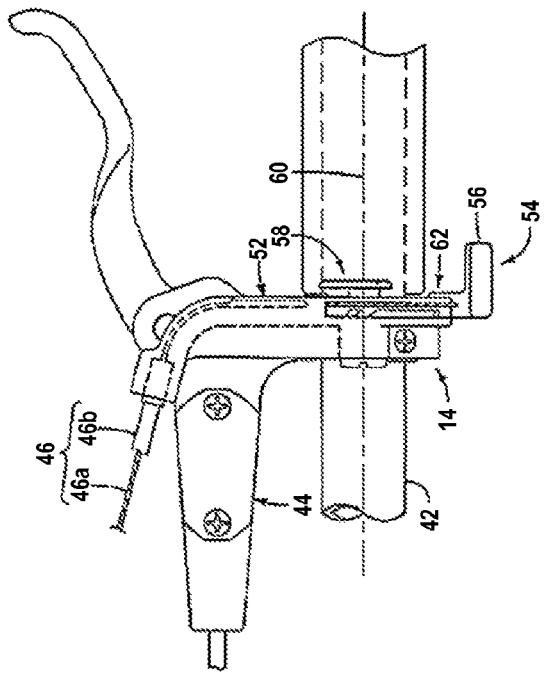
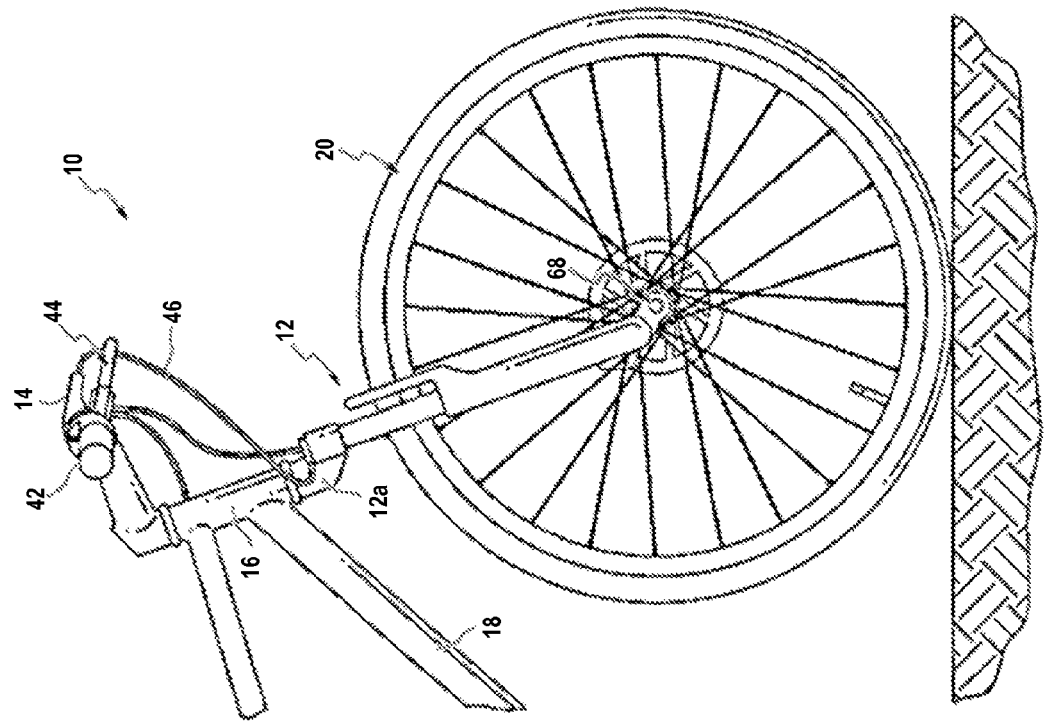

FIG. 5

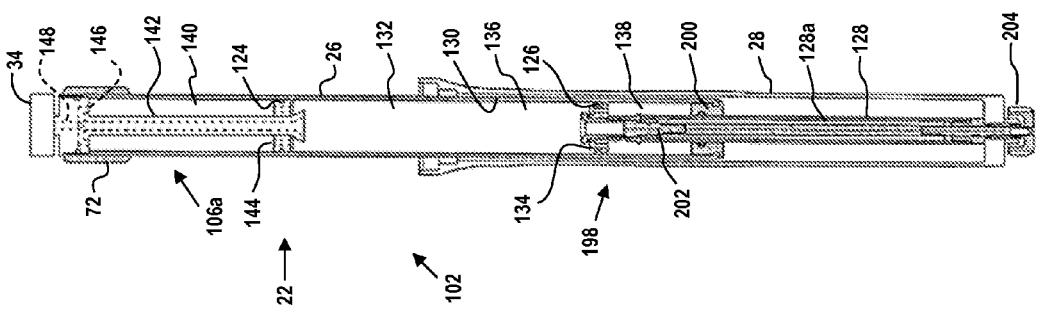

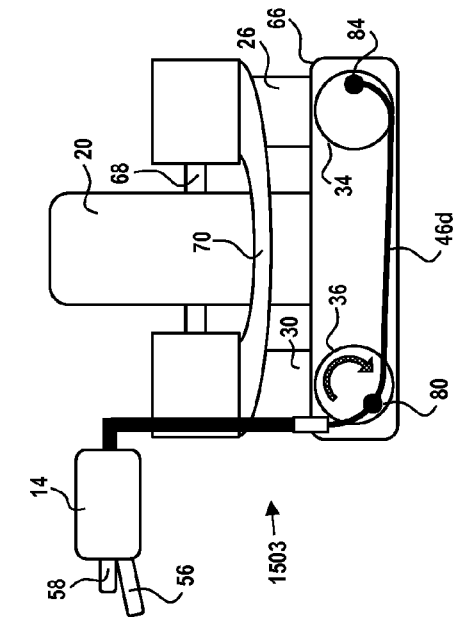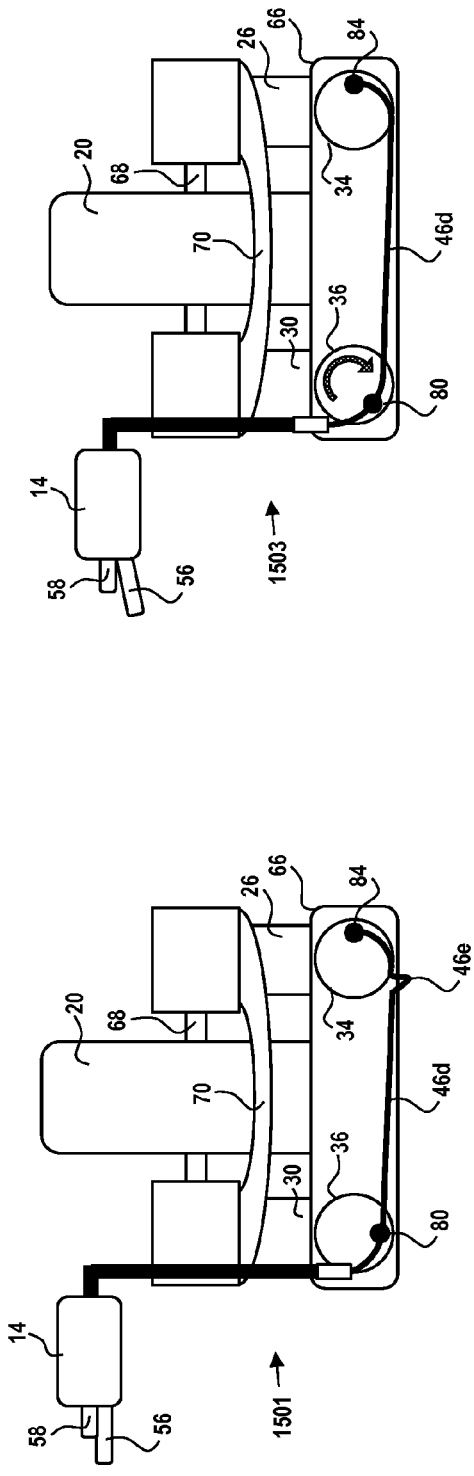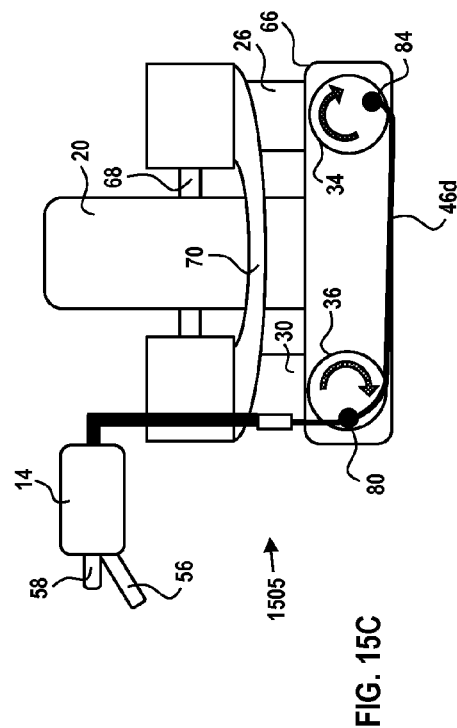

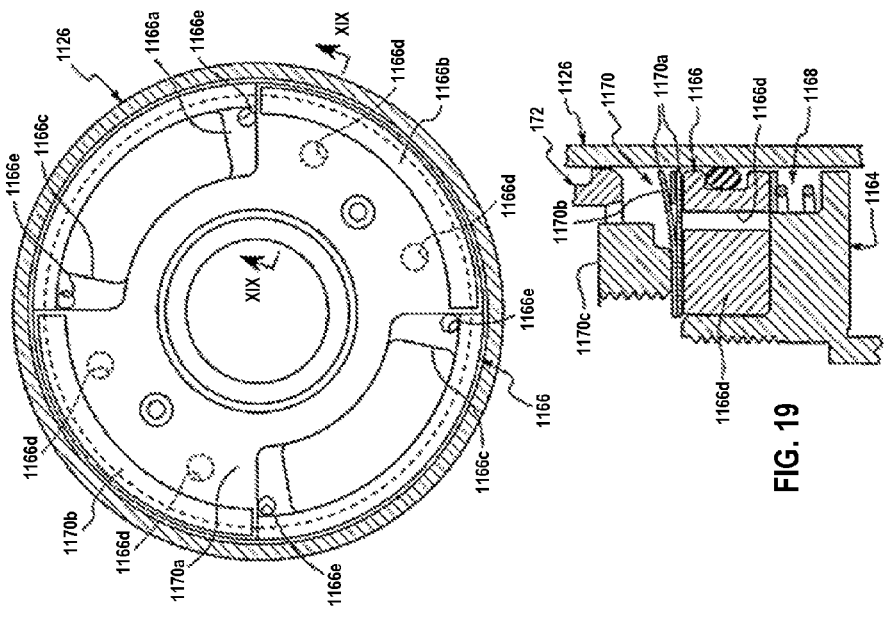
FIG. 18
FIG. 19
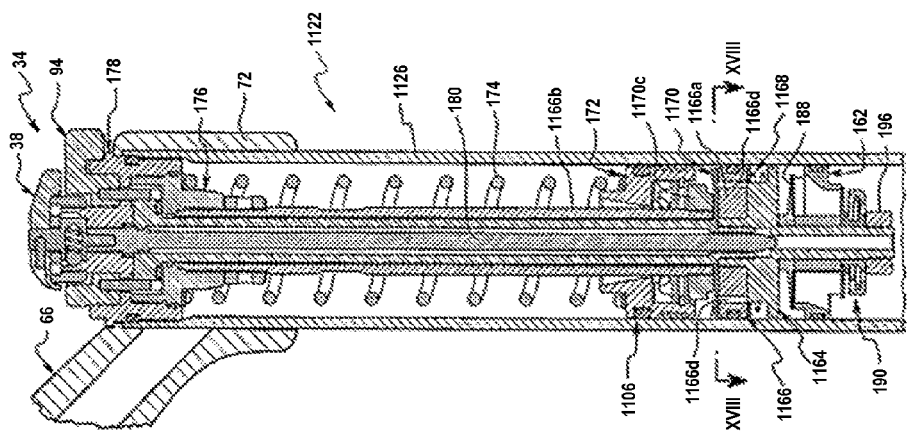
FIG. 17

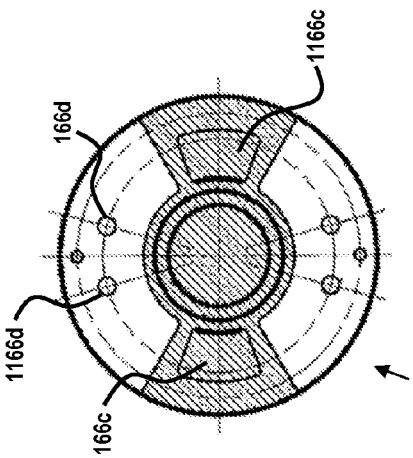
FIG. 20C-1
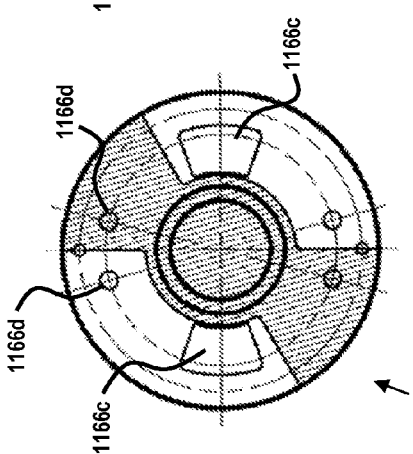
FIG. 20B-1
FIG. 20A-1
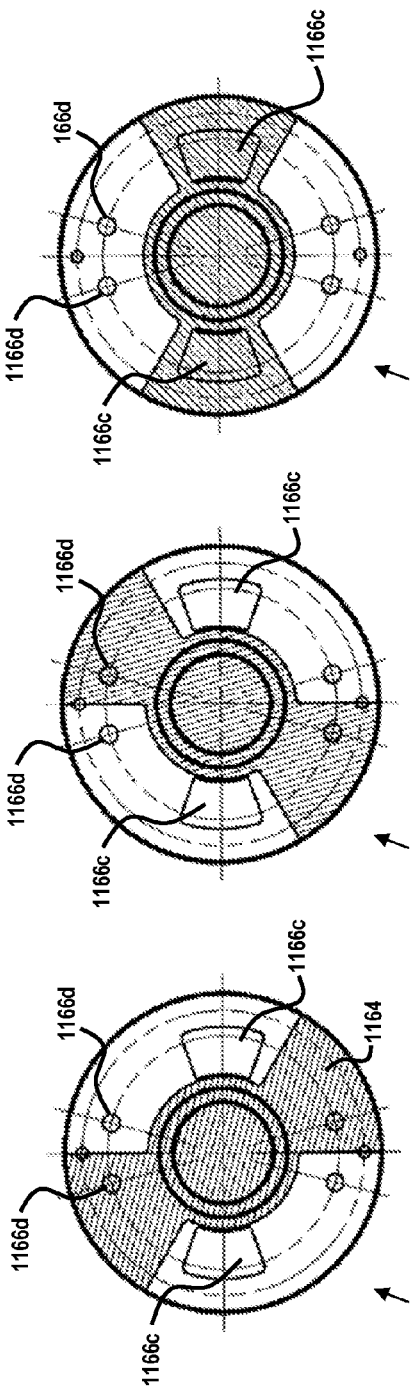
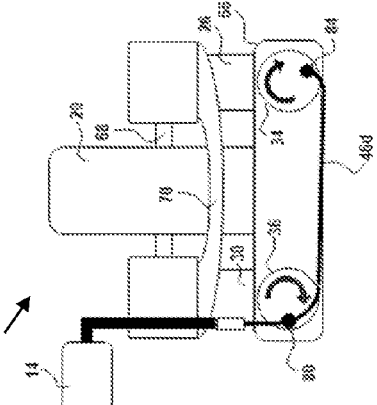
FIG. 20C-2
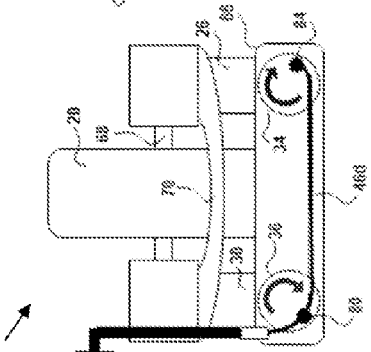
FIG. 20B-2
FIG. 20A-2
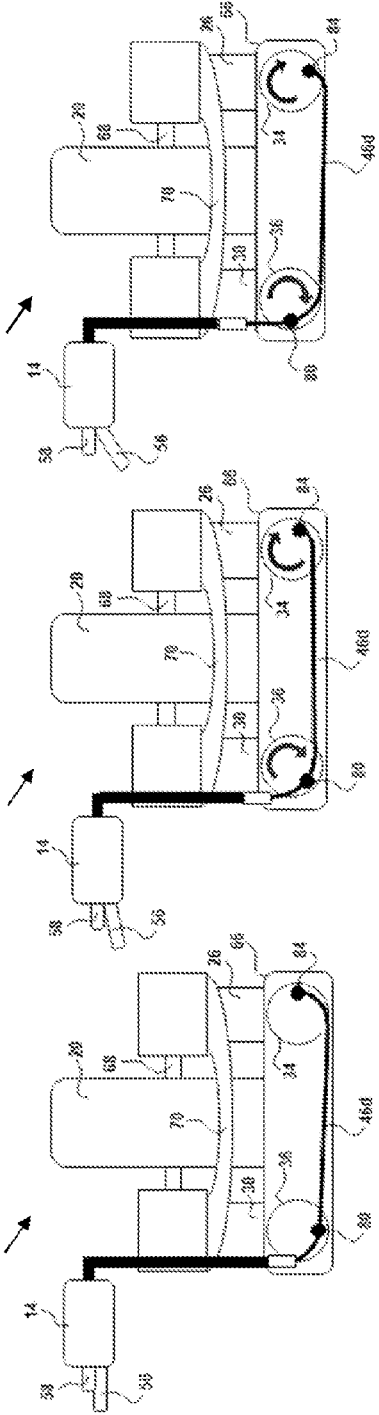

US 8,499,906 B2

BICYCLE SUSPENSION HAVING STROKE AND DAMPER ADJUSTMENT

BACKGROUND OF THE INVENTION

1. Field of the Invention

The present invention relates to a suspension for a bicycle.

2. Discussion of Background

Bicycling is becoming an increasingly more popular form of recreation, as well as a dependable means of transportation. Moreover, bicycling has become a very popular competitive sport for both amateurs and professionals, alike. Whatever the purpose, the bicycle industry is constantly seeking to improve various components of bicycles. For instance, conventional bicycles had rigid frames and forks without front or rear suspensions and, as a result, transmitted terrain-induced vibrations directly to a rider. More recently, bicycles, such as mountain bikes (MTB) and all-terrain bikes (ATB), have been fit with front and/or rear suspension assemblies configured to substantially absorb terrain-induced vibrations that would otherwise be transmitted to a rider. Depending upon the terrain, however, some riders may find it desirable to quickly adjust or even lockout these suspension assemblies. Even though bicycles including adjustable suspension assemblies have been introduced, such as in German Patent No. DE 19532088 A1, improvements upon the structure and function of these components are still desired.

SUMMARY OF THE INVENTION

An aspect of the present invention advantageously provides a bicycle suspension including a stroke adjustment unit, a suspension damper, a damper adjustment unit, and a control mechanism. The stroke adjustment unit is configured to adjust a stroke of the bicycle suspension, which is configured to expand and contract within the stroke. The suspension damper is configured to apply damping force to the bicycle suspension. The damper adjustment unit is configured to adjust the damping force applied by the suspension damper. The control mechanism operatively couples the stroke adjustment unit to the damper adjustment unit and is configured to sequentially adjust the stroke and the damping force.

Additional features, aspects, and advantages of the present invention will become apparent to those skilled in the art from the following detailed description, wherein various exemplary embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, wherein:

FIG. 1 is a schematic elevation view of a portion of a bicycle equipped with a suspension control unit configured to selectively control a suspension assembly of the bicycle, according to an exemplary embodiment;

FIG. 2 is a schematic plan view of the suspension control unit of FIG. 1, according to an exemplary embodiment;

FIGS. 4 and 5 are schematic perspective views of portions of the suspension assembly of FIG. 1, according to exemplary embodiments;

FIG. 6 is a simplified sectional view of a damper adjustment unit of the suspension assembly of FIG. 3, according to an exemplary embodiment;

FIG. 7 is a simplified sectional view of a stroke adjustment unit of the suspension assembly of FIG. 3, according to an exemplary embodiment;

FIGS. 15A-15C and 16A-16C schematically illustrate processes for controlling the suspension assembly of FIG. 1, according to exemplary embodiments;

FIG. 17 is a sectional view of a portion of a modified damper adjustment unit of FIGS. 3 and 8, according to an exemplary embodiment;

FIG. 18 is a sectional view of the damper adjustment unit of FIG. 17 taken along line XVIII-XVIII, according to an exemplary embodiment;

FIG. 19 is a sectional view of the damper adjustment unit of FIG. 18 taken along line XIX-XIX, according to an exemplary embodiment; and FIGS. 20A-1, 20A-2, 20B-1, 20B-2, 20C-1, and 20C-2 schematically illustrate a process for controlling the suspension assembly of FIG. 1 including the modified damper adjustment unit of FIGS. 17-19, according to an exemplary embodiment.

DESCRIPTION OF EXEMPLARY EMBODIMENTS

Figure 4:
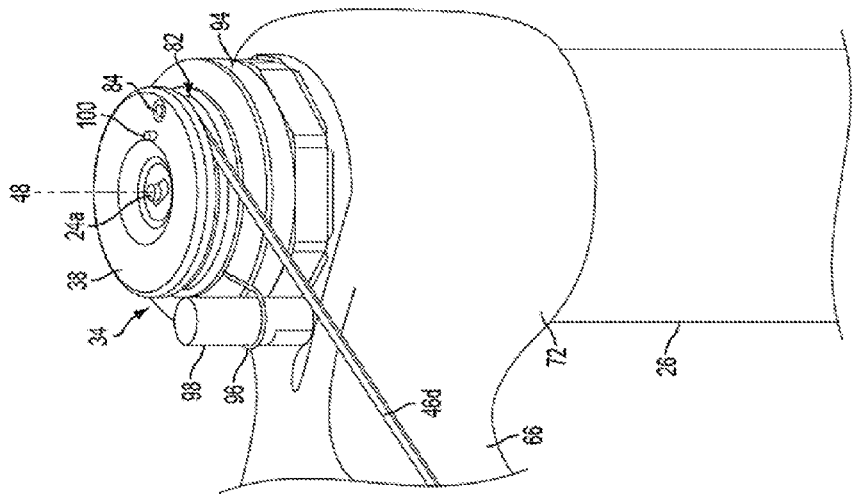

Various exemplary embodiments will now be described hereinafter with reference to the accompanying drawings, wherein like reference numerals designate corresponding or identical elements throughout the various drawings. Accordingly, the drawings and description are to be regarded as illustrative in nature, and not as restrictive.

Figure 3:
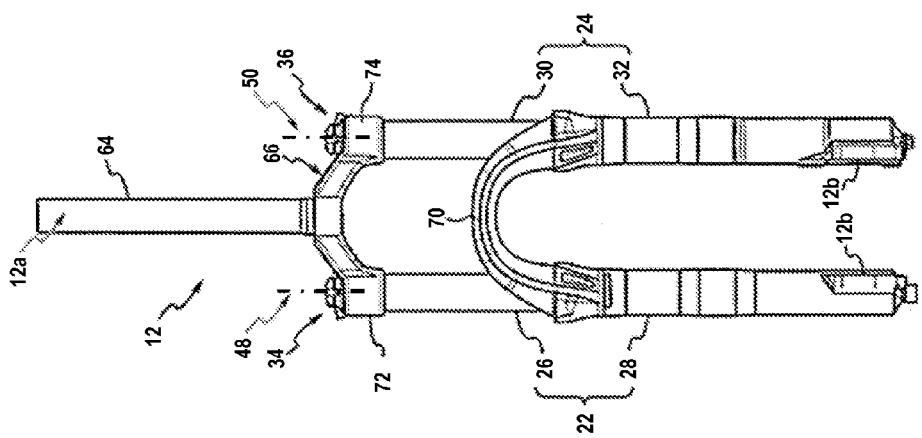
FIG. 3 is a schematic elevation view of the suspension assembly of FIG. 1, according to an exemplary embodiment.
Figure 5:
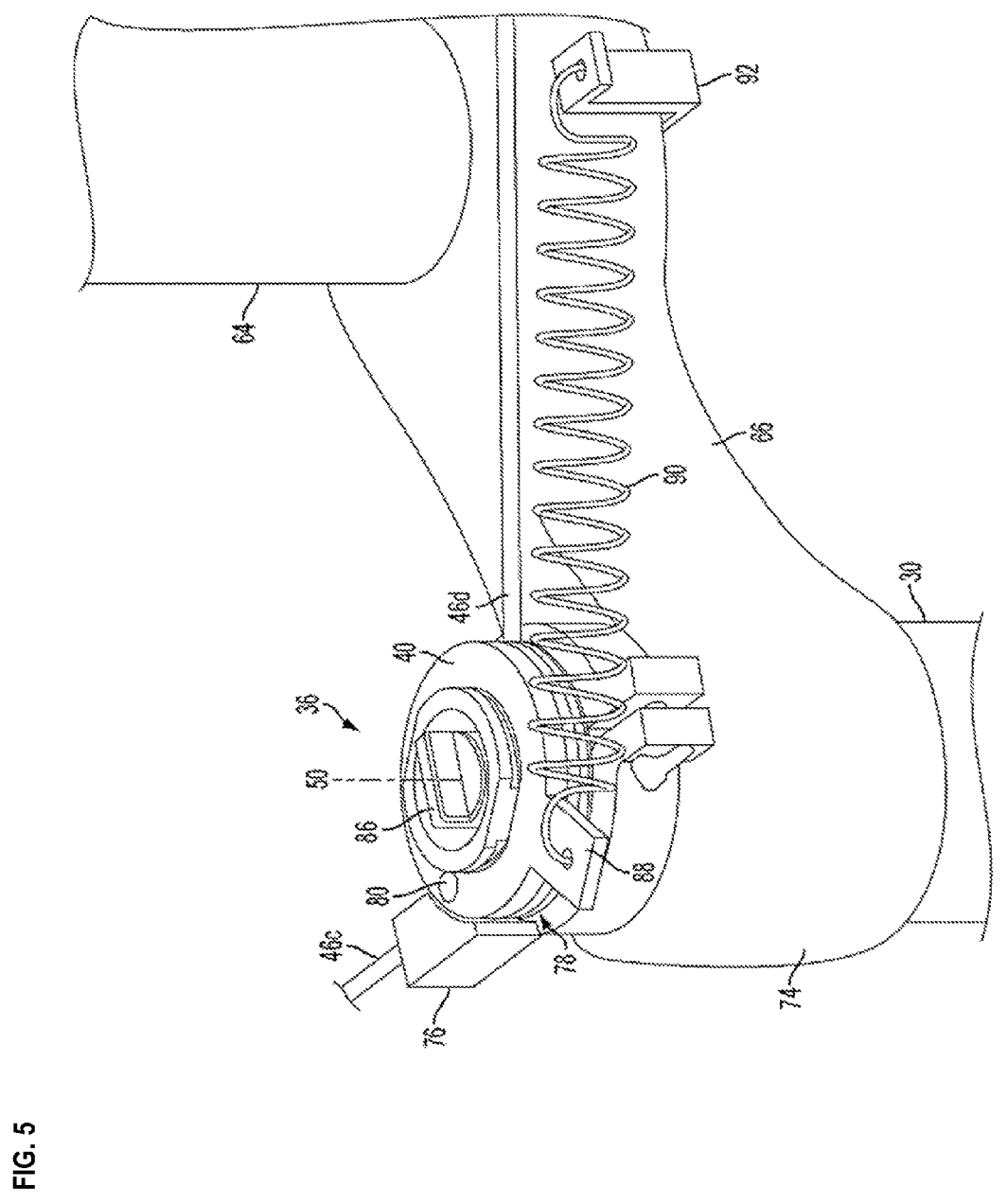

FIG. 1 is a schematic elevation view of a portion of a bicycle equipped with a suspension control unit configured to selectively control a suspension assembly of the bicycle, according to an exemplary embodiment. FIG. 2 provides a schematic plan view of the suspension control unit of FIG. 1, whereas FIGS. 3-5 illustrate various schematic views of the suspension assembly of FIG. 1. In one particular implementation, the suspension control unit is configured to enable a rider (not shown) to dynamically adjust a stroke and/or a damping force of the suspension assembly, such as a fork-type suspension assembly of a bicycle. While specific reference will be made hereto, it is contemplated that various exemplary embodiments also find application in other suspension assemblies, such as linear suspension assemblies, etc., as well as in other vehicles, e.g., tricycles, motorcycles, and the like.

Referring initially to FIGS. 1-3, a bicycle 10 includes a control unit 14 configured to dynamically control a fork-type suspension assembly (hereinafter suspension) 12 among various operating states, such as a first state (e.g., a first suspension setting), a second state (e.g., a second suspension setting) and a third state (e.g., a third suspension setting). These operating states are configured to sequentially adjust a stroke and a damping force of the suspension 12, as will become more readily apparent below. It is noted, however, that the control unit 14 may be configured to sequentially toggle between the first state and the second state and between the second state and the third state. As such, the control unit 14 may sequentially adjust the stroke and the damping force.

According to various exemplary embodiments, an upper end portion 12a of the suspension 12 is rotatably mounted within, for example, a head tube 16 of a frame 18 of the bicycle 10 and lower end portions 12b of the suspension 12 are rotatably coupled to a wheel 20 of the bicycle 10. In this manner, the suspension 12 is configured to absorb, for instance, terrain-induced vibrations that would otherwise be transmitted to a rider (not shown) through the frame 18 and the wheel 20. According to one embodiment, the first state of the suspension 12 may relate to a relatively "long" stroke suspension setting, whereas the second state may relate to a relatively "short" stroke suspension setting, as will become more readily apparent below. In certain instances, the suspension 12 may be dynamically locked out, such as when an operating state (e.g., a third state) of the suspension 12 is controlled to lock a damping force of the suspension 12. As such, actuation (e.g., contraction and expansion (or rebound)) of a first shock absorber unit 22 and a second shock absorber unit 24 of the suspension 12 may be dynamically adjusted and locked or unlocked via the control unit 14.

As seen in FIGS. 1 and 3-5, the suspension 12 includes the first shock absorber unit 22 that includes an upper telescopic member 26 slidably received within a lower portion 28, and the second shock absorber unit 24 that includes an upper telescopic member 30 slidably received within a lower portion 32. In this manner, the first and second shock absorber units 22 and 24 are configured to absorb and dampen, for example, terrain-induced vibrations when riding the bicycle 10. The upper telescopic members 26 and 30 are respectively provided with suspension setting mechanisms 34 and 36 for dynamically adjusting a stroke and/or damping force of the suspension 12 and, as a result, enabling a rider to control the expansion (or rebound) and contraction of the telescopic members 26 and 30. The suspension setting mechanisms 34 and 36 are provided with respective cable operated adjustment pulleys (or adjustment actuators) 38 and 40 that can be actuated (e.g., rotated) between at least two positions, such as the first state corresponding to the relatively "long" stroke suspension setting, and the second state corresponding to the "short" stroke suspension setting), via the control unit 14. According to certain embodiments, one or more of the cable operated adjustment pulleys 38 and 40 may be actuated, via the control unit 14, to a third state corresponding to a locked-out suspension setting.

Averting back to FIGS. 1 and 2, the control unit 14 may be mounted to a handlebar 42 of the bicycle 10 via a tube clamp of a brake lever 44; however, it is contemplated that the control unit 14 may be alternatively mounted to the handlebar 42 via a separate tube clamp or any other suitable mounting device or assembly. In the illustrated embodiment, the control unit 14 is configured and, thereby, arranged to operate one or more of the adjustment pulleys 38 and 40 by, for example, a control cable 46, such as a bowden cable, etc., that includes an inner wire 46a and an outer casing 46b. The inner wire 46a may be manipulated via the control unit 14, such as in a "pulling" fashion, for switching the suspension 12 from, for instance, the first state to the second state and from the second state to the third state. It is noted that the inner wire 46a may also be manipulated via the control unit 14, such as in a "releasing" fashion, for switching the suspension 12 from the second state to the first state and from the third state to the second state. As a result, when the control unit 14 is actuated to, for instance, "pull" the inner wire 46a, one or more of the adjustment pulleys 38 and 40 may rotate about respective rotational axes 48 and 50 in a first direction of rotation, such that when the control unit 14 is actuated to "release" the inner wire 46a, one or more of the adjustment pulleys 38 and 40 may rotate about the rotational axes 48 and 50 in a second direction of rotation, such as an opposite direction of rotation.

As seen in FIG. 2, the control unit 14 includes a base member 52 and a wire winding mechanism 54 having a lever portion 56 and a release mechanism 58. The base member 52 is a stationary member fixedly mounted to the handlebar 42 and is positioned to enable a rider to easily manipulate the wire winding mechanism 54 and the release mechanism 58, such as, for example, without requiring the rider's hand to leave the handlebar 42. Generally, the wire winding mechanism 54 has an operating path that curves about a center mounting axis 60 of the handlebar 42, while the release mechanism 58 has an operating path that extends, such as linearly, e.g., parallel, with respect to the mounting axis 60. The wire winding mechanism 54 includes a first operating member 62 movably mounted relative to the base member 52 for rotation between the first state and the second state and between the second state and the third state, such as about a rotational axis.

According to exemplary embodiments, the first operating member 62 may have a resting position, which may correspond to the first state. In this manner, the first operating member 62 may be biased relative to the base member 52 and, thereby, establish (or otherwise correspond to) the second state. Accordingly, a user can manipulate, e.g., pull or otherwise actuate, the operating member 62 from the first state to one or more of the second or third states. It is noted that the operating member 62 "locks" in place when manipulated from the first state to the second or from the second state to the third state. In order to return from a locked position, the user may actuate the release mechanism 58, which is configured to "unlock" the operating member 62 from, for instance, the second state or the third state. As such, the aforementioned biasing effect returns the operating member 62 to, for instance, the first state or the second state. Although exemplary embodiments are described with respect to the control unit 14, other suitable or equivalent control units may be additionally (or alternatively) utilized, as will be readily apparent to those of ordinary skill in the art. Furthermore, it is contemplated that one or more intermediary operating states may be provided between the first state and the second state and/or between the second state and the third state.

Averting to FIGS. 3-5, the suspension 12 may be incorporated into (or otherwise define) a fork of the bicycle 10, such as a front-fork of the bicycle 10. It is contemplated, however, that the suspension 12 may be alternatively (or additionally) utilized as or part of a rear suspension assembly and, thereby, may include other control units corresponding to these other suspension assembly configurations. In the illustrated embodiment, however, the suspension 12 includes a center tubular member (e.g., a steerer tube) 64 pivotally connected to the frame 18 and a bracket (or first connector) 66 that rigidly connects center the tubular member 64 to the first shock absorber unit 22 and the second shock absorber unit 24, which are respectively attached at the lower end portions 12b to either ends of an axle 68 of the wheel 20. A structural member or bracket (or second connector) 70 is provided and configured to rigidly connect the lower portion 28 of the shock absorber unit 22 to the lower portion 32 of the second shock absorber unit 24. In this manner, the structural member 70 provides structural stability to the suspension 12. It is noted that the frame 18, via the head tube 16, is rotatably attached to the center tubular member 64 of the upper telescopic members 26 and 30 (which are interconnected via the bracket 66), and the wheel 20 is attached to the lower portions 28 and 32 (which are interconnected via a bracket 74) of the shock absorber units 22 and 24, respectively. As such, the suspension 12 may be provided between the frame 18 and the wheel 20 so as to enable terrain-induced vibrations from, for example, the wheel 20 to be absorbed and dampened instead of being transmitted to the frame 18 and a rider thereon.

According to various exemplary embodiments, the first shock absorber unit 22 includes the upper telescopic member 26 having an upper end thereof connected to (e.g., threadedly engaged with) a connecting bracket 72 of the bracket 66. The upper telescopic member 26 also includes a lower end thereof slidably received within an upper end of the lower portion 28 of the first shock absorber unit 22. In a similar fashion, the second shock absorber unit 24 includes the upper telescopic member 30 having an upper end thereof connected to (e.g., threadedly engaged with) a connecting bracket 74 of the bracket 66 and a lower end thereof slidably received within an upper end of the lower portion 32 of the second shock absorber unit 24. As previously noted, the lower end portions 12b of the lower portions 28 and 32 are attached to the axle 68 of the wheel 20 via any suitable coupling device, assembly, or mechanism.

With continued reference to FIGS. 1 and 3, the suspension setting mechanisms 34 and 36 are provided at upper end portions of the upper telescopic members 26 and 30, respectively, and protrude from an upper surface of the bracket 66. The suspension setting mechanisms 34 and 36 respectively include adjustment actuators (i.e. the adjustment pulleys) 38 and 40 configured to respectively adjust a stroke and a damping force of the suspension 12. Even though the suspension setting mechanisms 34 and 36 are shown exposed to an ambient environment, it is contemplated that the suspension setting mechanisms 34 and/or 36 may be covered (or otherwise concealed) by way of one or more housing members (not shown). The suspension setting mechanisms 34 and 36 are described in more detail in accordance with FIGS. 4, 5, and 8-10.

FIGS. 4 and 5 provide enlarged, schematic perspective views of the suspension setting mechanisms 34 and 36 of the suspension 12, respectively. According to exemplary embodiments, the suspension setting mechanisms 34 and 36 respectively include the adjustment pulleys 38 and 40 configured to be actuated, e.g., rotated about respective rotational axes 48 and 50, via interaction with the control unit 14, such as manipulation of the operating member 62 of the control unit 14 among and between various operating states. In this manner, a portion 46c of the control cable 46 may extend from the control unit 14 to a cable receiving portion 76 of the suspension setting mechanism 36. The portion 46c of the control cable 46 may be secured in a recessed region 78 of the adjustment pulley 40 via any suitable coupling mechanism 80, such as a set screw. Accordingly, a portion 46d of the control cable 46 may extend from the adjustment pulley 40 to the adjustment pulley 38 and may be correspondingly secured in a recessed region 82 of the adjustment pulley 38 via any suitable coupling mechanism 84, such as a set screw. As will become more readily apparent below, adjusting an operating tension of the control cable 46 causes one or more of the adjustment pulleys 38 and 40 to rotate about respective rotational axes 48 and 50 and, thereby, affecting a change in a stroke and/or damping force characteristic of the suspension 12. Accordingly, the control unit 14 and the control cable 46 essentially constitute a control mechanism operatively coupling a stroke adjustment unit to a damper adjustment unit of the suspension 12 so as to sequentially adjust the stroke and the damping force of the suspension 12.

According to certain exemplary embodiments, the adjustment pulley 40 may be biased relative to a rotational position (e.g., resisting state) of a shaft 86 of the second shock absorber unit 24 that, when actuated (e.g., rotated), is configured to modify a stroke of the suspension 12. It is noted that one or more internal components of the second shock absorber unit 24 for effectuating these modifications (or adjustments) are described in more detail in accordance with FIGS. 7 and 8. In this manner, the adjustment pulley 40 may include a second anchoring portion 88 for coupling the adjustment pulley 40 to a distal end of a biasing member (such as a coil spring) 90 configured to bias the adjustment pulley 40 to, for instance, one or more of the aforementioned operating states, such as about the rotational axis 50. An opposing distal end of the biasing member 90 may be coupled to, for instance, an anchoring bracket 92 extending from and fixedly engaged with the bracket 66 of the suspension 12.

Additionally (or alternatively), the adjustment pulley 38 may be biased relative to a rotational position (e.g., resting state) of an actuating member 94 of the first shock absorber unit 22 that, when actuated (e.g., rotated), is configured to modify a damping force of the suspension 12. In certain embodiments, rotation of the pulley 38 eventually engages the actuating member 94, such that both pulley 38 and actuating member 94 may rotate as a unit. Accordingly, rotation of the actuating member 94 may be utilized to "lockout" the first shock absorber unit 22. It is noted that one or more internal components of the first shock absorber unit 22 for effectuating "lockout" and/or dampening adjustments are more fully described in association with FIGS. 6 and 9-14. In this manner, a biasing member (such as a torsion spring) 96 may be anchored between a first anchoring portion 98 and the adjustment pulley 38. For instance, a torsion spring 96 may be coiled about an inner diametrical surface (not shown) of recess region 82 of the adjustment pulley 38. As such, a first distal end of the torsion spring 96 may be anchored to the first anchoring portion 98, whereas a second distal end of torsion spring 96 may be anchored to the adjustment pulley 38 via bore opening 100. Accordingly, torsion spring 96 may bias the adjustment pulley 38 to, for instance, one or more of the aforementioned operating states, such as about rotational axis 48.

FIGS. 6 and 7 are, respectively, simplified sectional views of the first and second shock absorber units 22 and 24 of the suspension 12. It is noted that the component(s) of the first and second shock absorber units 22 and 24 are shown in a generic manner in order to simplify the depictions thereof, whereas FIGS. 8-14 provide more detailed views of the first and second shock absorber units 22 and 24. According to exemplary embodiments, the first shock absorber unit 22 is configured as a damper adjustment unit and, thereby, incorporates an adjustable dampening unit 102, whereas the second shock absorber unit 24 is configured as a stroke adjustment unit and, thereby, incorporates an adjustable air spring 104, which in unison (via, for example, the bracket 66) provide the suspension 12 with adjustable spring and dampening characteristics. It is noted that the first shock absorber 22 incorporates a damper adjustment unit 106a on an upper end of the adjustable dampening unit 102 and the second shock absorber unit 24 incorporates a stroke adjustment unit 108 on an upper end of the adjustable air spring 104.

Referring to FIG. 7, the adjustable air spring 104 includes an upper seal member 110 connected to the upper telescopic member 30 via the stroke adjustment unit 108. A longitudinal position of the upper seal member 110 along the upper telescopic member 30 may be adjusted by the stroke adjustment unit 108, which will become more apparent below. It is noted that adjustment of the stroke adjustment unit 108 determines a stroke length (e.g., maximum, minimum, etc., stroke length) of the second shock absorber unit 24.

According to various exemplary embodiments, the adjustable air spring 104 includes a lower seal member 112 rigidly connected to a lower end of the lower portion 32 via a tube 114. The lower seal member 112 is slidably received within a tube 116 connected to the upper seal member 110 and, thereby, a chamber (e.g., an air chamber) 118 is defined between the upper seal member 110 and the lower seal member 112. In this manner, the lower seal member 112 may be referred to as a "piston" 112. It is noted that the chamber 118 may act as an air spring between the upper telescopic member 30 (via the upper seal member 110) and the lower portion 32 (via the lower seal member 112). A relative constant volume and, thereby, variable pressure of gas (e.g., air) within the chamber 118 may be adjusted via a valve/nozzle 120, which is fluidly connected to the chamber 118 via a passage extending through the tube 114. The adjustable air spring 104 may also include a coil spring 122 that functions to bias the lower seal member 112 toward upper seal member 110 and, thereby, provides further spring and/or dampening characteristics to the adjustable air spring 104.

As previously described, the stroke adjustment unit 108 can be used to adjust a stroke length of the second shock absorber unit 24 by adjusting a longitudinal position of the upper seal member 110 along a length of the upper telescopic member 30. Since a volume of for instance, air within the chamber 118 can remain relatively constant during use (absent adjustment via the valve/nozzle 120), relative positions between the upper seal member 110 and the lower seal member 112 remain relatively constant when external forces (e.g., vibrations) on the suspension 12 are disregarded. As such, adjustment of a longitudinal position of the upper seal member 110 along the upper telescopic member 30 has an effect of adjusting a longitudinal position of the lower seal member 112 in a same direction, which thereby adjusts a stroke length of the second shock absorber unit 24. For example, if the upper seal member 110 is displaced upward (e.g., toward a suspension setting unit 36), then the lower seal member 112 may also displace upward relative to the upper telescopic member 30 and, for instance, a maximum stroke length of the second shock absorber unit 24 can be reduced. Such a stroke adjustment is transmitted to the first shock absorber unit 22 via the structural member 70.

Averting to FIG. 6, the dampening unit 102 includes an upper seal member 124 rigidly connected to the upper telescopic member 26. The dampening unit 102 further includes a lower seal member 126 rigidly connected to a lower end of the lower telescopic member 28 by a tube 128. The lower seal member 126 is slidably received within a tube 130 of the upper telescopic member 26. In this manner, the lower seal member 126 may be referred to as a "piston" 126. A fluid chamber 132 is defined between the upper seal member 124 and the lower seal member 126 on a lower end of the upper telescopic member 26. Accordingly, the fluid chamber 132 may contain, therein, any suitable dampening fluid, such as oil, that is used in conjunction with the lower seal member 126 to act as a damper. The lower seal member 126 includes a plurality of holes (or fluid flow ports) 134 that enable fluid from the fluid chamber 132 to travel therethrough. In this manner, the lower seal member 126 effectively divides the fluid chamber 132 into an upper cavity 136 and a lower cavity 138, with the holes 134 of the lower seal member 126 enabling fluid to travel from one cavity to the other depending on a force(s) acting on the upper telescopic member 26 and the lower portion 28. It is noted that an effective dampening force realized by way of the dampening unit 102 is substantially related to a volume of fluid capable of traveling through the holes 134 when the lower seal member 126 received within the tube 130 is displaced into (or out of) the fluid chamber 132. As such, dampening forces may act on the upper telescopic member 26, as well as the lower portion 28.

As seen in FIG. 6, the damper adjustment unit 106a includes several components that enable fluid from the fluid chamber 132 to be displaced into and out of a reservoir chamber 140 disposed, for example, above the upper seal member 124. For instance, a tube 142 may be provided to extend downward through an opening in the upper seal member 124, one or more holes 144 are provided in the upper seal member 124, and one or more one-way valves (e.g., backflow flaps that may be spring-biased) for the holes 144 are provided on a lower surface of the upper seal member 124 to enable fluid flow into, but not out of the fluid chamber 132. One or more upper openings 146 are provided, for example, at an upper end of the tube 142, and one or more one-way valves for the upper openings 146 are provided to enable upward flow from the fluid chamber 132 and into the reservoir chamber 140 through the openings 146, but not downward fluid flow from the openings 146 to the fluid chamber 132 through the tube 142. According to particular embodiments, the damper adjustment unit 106a includes a valve 148 acting as an actuator capable of closing or opening the upper openings 146 for controlling fluid flow to the reservoir cavity 140. It is noted that when the valve 148 is closed, the openings 146 are also closed and, thus, fluid is prevented from flowing between the fluid chamber 132 and the reservoir cavity 140. In this manner, the damper adjustment unit 106a can provide a lockout feature for the first shock absorber unit 22.

Figure 8:
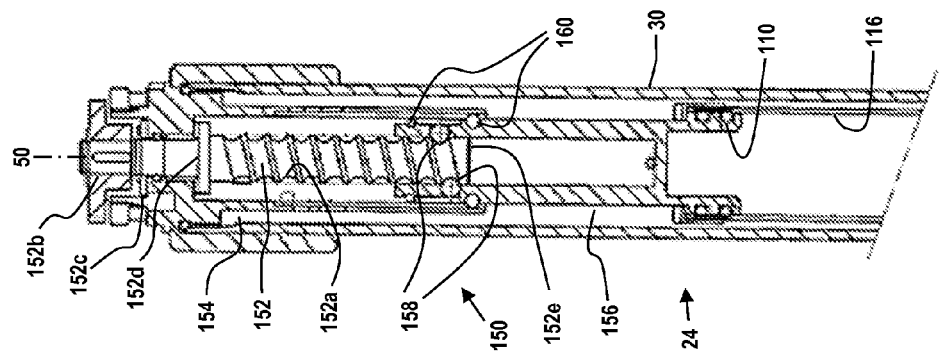
FIG. 8 is a sectional view of a portion of the stroke adjustment unit of FIGS. 3 and 7, according to an exemplary embodiment.

FIG. 8 is an enlarged, partial sectional view of a stroke adjustment unit 150 of the second shock absorber unit 24. The stroke adjustment unit 150 includes a shaft 152 having a helically threaded or grooved surface 152a on an outer circumference thereof, which is provided as an actuator for adjusting a stroke of the second shock absorber unit 24. Generally, the adjustment unit 150 includes the shaft 152, an upper cylinder 154 having an upper portion rigidly connected to an upper end of the upper telescopic member 30, and a lower cylinder 156 having an upper portion slidably received within a lower portion of the upper cylinder 154. The shaft 152 is rotatably received by an upper portion of the upper cylinder 154. It is noted that the shaft 152 includes an upper end 152b acting as the adjustment actuator 40, or a component thereof. The shaft 152 also includes flanges 152c and 152d positioned adjacent to an upper surface and a lower surface, respectively, of the upper cylinder 154 such that the shaft 152 cannot axially move, but may rotate about a rotational axis thereof. A lower end 152e of the shaft 152 is provided within a lower portion of the upper cylinder 154.

The upper portion of the lower cylinder 156 includes ball members 158 that mesh with the threaded surface 152a of the shaft 150 and support the lower cylinder 156 within an interior of the upper cylinder 154. Seals or gaskets 160 (e.g., O-rings, etc.) are provided on an outer circumference of an upper portion of the lower cylinder 156 in order to seal an interface between the lower cylinder 156 and the upper cylinder 154. As previously described, the control unit 14 is configured to manipulate (e.g., rotate) the upper end 152b of the shaft 152, such that corresponding rotational motion of the helically threaded or grooved surface 152a guides the ball members 158 and the lower cylinder 156 can relatively move upward or downward within the upper cylinder 154 as guided by the seals 160. Such mechanical adjustment of the stroke adjustment unit 150, such as via the threaded surface 152a of the shaft 152, provides fine control over adjustment settings of a stroke length, given that an adjusted length of a stroke and its adjustable range can be precisely determined with respect to an amount of rotation of the shaft 152. For example, a diameter of the actuator shaft 152 and a pitch of threaded portion 152a thereon can be selected for providing a desired adjustment setting, e.g., a desired maximum, minimum, etc., length with a desired adjustability of length between the maximum and minimum lengths.

Figure 10:
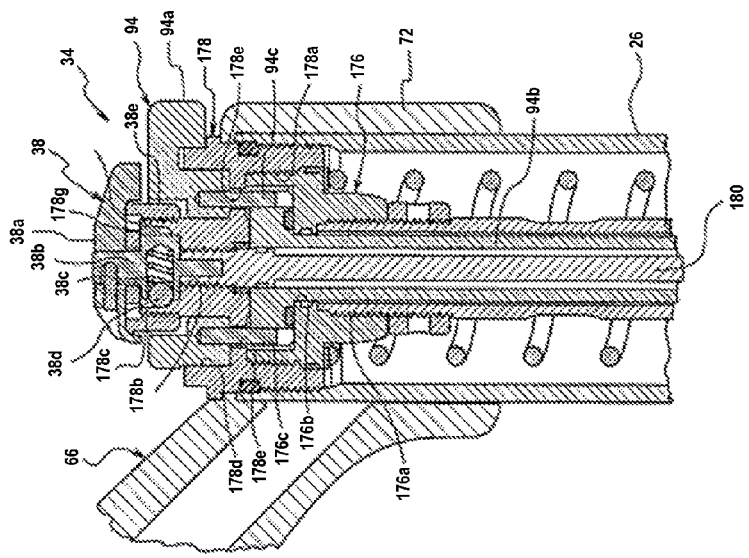
FIGS. 9 and 10 are sectional views of portions of the damper adjustment unit of FIGS. 3 and 8, according to an exemplary embodiment.
Figure 9:
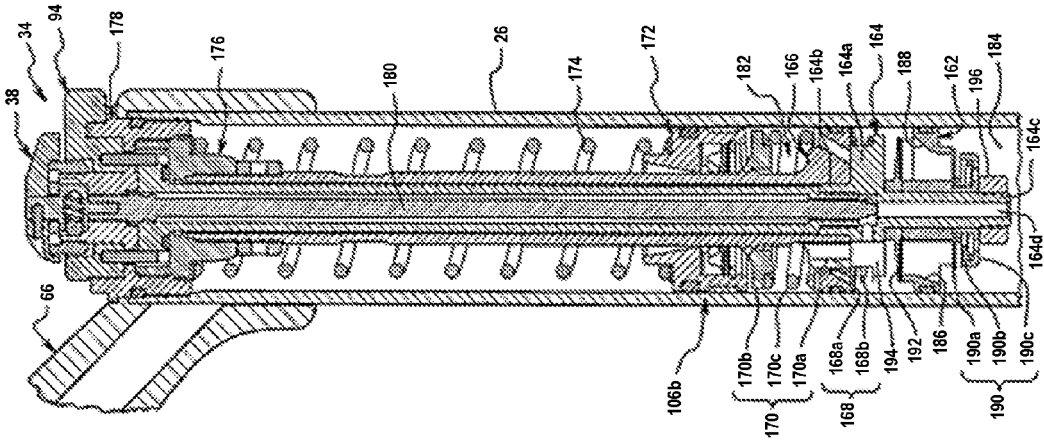

Referring now to FIGS. 9 and 10, there are illustrated two sectional views of a damper adjustment unit 106b of the first shock absorber unit 22. According to various exemplary embodiments, the damper adjustment unit 106b may include a damping piston 162, a lockout valve 164, a lockout piston 166, a return valve 168, a blow-off mechanism 170, a free piston 172, a compression spring 174, an upper support member 176, an upper body member 178, and a damping force adjustment valve 180. The lockout valve 164 and the lockout piston 166 cooperate to form a damping lockout mechanism that effectively locks the suspension 12 so that the suspension 12 can function as a rigid non-suspension fork, when in a "locked out" mode.

The suspension setting mechanism 34 is positioned at a top portion of the upper telescopic member 26 and is operatively coupled to the lockout valve 164 and the damping force adjustment valve 180. According to particular embodiments, the suspension setting mechanism 34 includes a first actuating member 38 and a second actuating member 94. The first actuating member 38 is operatively coupled to the damping force adjustment valve 180 to enable adjust of a damping force of the damper adjustment unit 106b. The second actuating member 94 is operatively coupled to the lockout valve 164.

The damping piston 162 essentially divides the upper telescopic member 26 into two areas so as to define an upper internal chamber 182 (e.g., reservoir chamber 140) and a lower internal chamber 184 (e.g., fluid chamber 132). In this manner, the damping piston 162 includes an annular seal or O-ring disposed between an outer peripheral surface and an internal surface of the upper telescopic member 26 to create a seal therebetween and, thereby, upper and lower internal chambers 182 and 184. The damping piston 162 may also include a plurality of rebound ports 186 and a plurality of compression ports 188. The rebound ports 186 and the compression ports 188 are alternately arranged about the damping position 162, such as in a circumferential manner around the damping piston 162. In one embodiment, the damping piston 162 includes a check valve 190 and a shim stack valve 192; however, it is contemplated that other suitable directional valves (or flow control mechanisms) may be employed.

In the depicted embodiment, the check valve 190 may include a check valve plate 190a, a compression spring 190b, and a spring retainer 190c. In this manner, the check valve plate 190a may press against a lower end of the damping piston 162 in light of a biasing force imposed by the compression spring 190b that normally closes off the rebound ports 186; however, during suspension rebound (e.g., expansion of the suspension 12), fluid from the upper internal chamber 182 displaces check valve plate 190a from the lower end of the damping piston 162 and, thereby, opens the rebound ports 186, which enables fluid from the upper internal chamber 182 to flow therethrough. As such, the check valve 190 selectively enables fluid communication between the upper internal chamber 182 and the lower internal chamber 184 through the rebound ports 186 during rebounding displacement of the suspension 12.

The shim stack valve 192 normally abuts an upper end of the damping piston 162 to close off the compression ports 188. In this manner, the shim stack valve 192 may be a single shim, or a stack comprised of multiple shims, which may be substantially annular in shape, however, any suitable geometry may be utilized. The shim stack valve 192 selectively allows fluid communication between the upper internal chamber 182 and the lower internal chamber 184 via the compression ports 188. During compression of the suspension 12, the shim stack valve 192 may essentially serve as a diaphragm spring and, thereby, is configured to flex in response to sufficient aggregation of fluid pressure in the lower internal chamber 184. During rebounding displacement of the suspension 12, the shim stack valve 192 is engaged with an upper surface of the damping piston 162 to prevent fluid from flowing through the shim stack valve 192. It is noted, however, that the check valve 190 enables fluid communication between the upper internal chamber 182 and the lower internal chamber 184 through the rebound ports 186 during rebound of the suspension 12.

The lockout valve 164 is rotatably mounted in the upper telescopic member 26 with its outer peripheral surface spaced inwardly from an internal surface of the upper telescopic member 26. In this manner, the lockout valve 164 is rotatable between a lockout position corresponding to a non-damping or lockout mode and an unlocked position corresponding to a normal damping or operating mode. According to various exemplary embodiments, however, the lockout valve 164 may be rotatable between any number of positions that ultimately progress towards the aforementioned lockout position. In any event, rotating the lockout valve 164 to a lockout position (or state), fluid flow through the lockout piston 166 and, thereby, between the upper and lower internal chambers 182 and 184 is effectively blocked. When the lockout valve 164 is in an unlocked position, fluid may flow through the lockout piston 166 and, thereby, between the upper and lower internal chambers 182 and 184 so that the suspension 12 can operate in one or more "normal" operating modes, i.e., one or more modes configured to absorb terrain-imposed vibrations.

Figure 11:
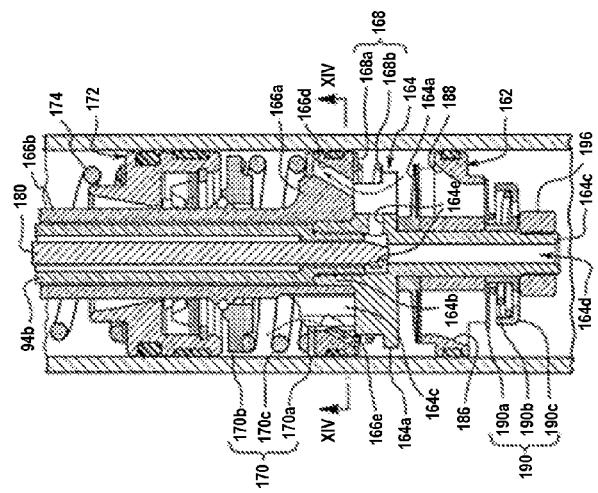
FIG. 11 is a sectional view of a portion of the damper adjustment unit of FIGS. 3 and 8 in a "normal" operating state, according to an exemplary embodiment.
Figure 12:
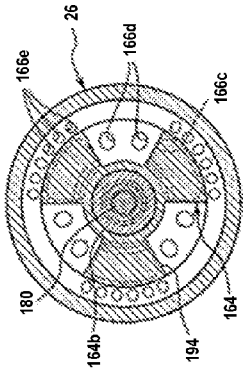
FIG. 12 is a sectional view of the damper adjustment unit of FIG. 11 taken along line XII-XII, according to an exemplary embodiment.
Figure 13:
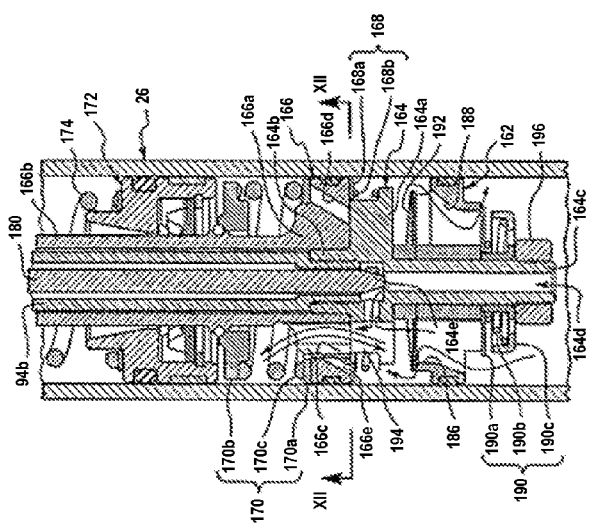
FIG. 13 is a sectional view of a portion of the damper adjustment unit of FIGS. 3 and 8 in a "locked out" operating state, according to an exemplary embodiment.
Figure 14:
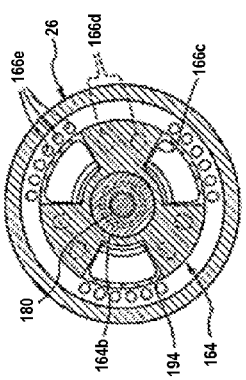
FIG. 14 is a sectional view of the damper adjustment unit of FIG. 13 taken along line XIV-XIV, according to an exemplary embodiment.

Averting to FIGS. 11 and 13, the lockout valve 164 may include a main body portion 164a, an upper shaft portion 164b, and a lower shaft portion 164c. A center bore 164d extends axially through the portions 164a to 164c to enable fluid to flow therethrough. As seen in FIGS. 12 and 14, the main body portion 164a includes a plurality of lobe sections (e.g., three lobe sections), which may be equally spaced apart in a circumferential direction and, thereby, define a plurality of axial fluid flow passages 194. In this manner, a plurality of radial bores (e.g., three radial bores) 164e extend radially from the center bore 164d to axial fluid flow the passages 194 to enable fluid to flow from the center bore 164d through the radial bores 164e to axial fluid flow the passages 194 during compression of the suspension 12. Accordingly, the center bore 164d and the radial bores 164e form a center compression fluid passage connecting the lower internal chamber 184 to the upper internal chamber 182. The damping force adjustment valve 180 can be disposed in the center bore 164d of the lockout valve 164 for regulating a flow rate of fluid passing from the center bore 164d through the radial bores 164e to axial fluid flow passages 194. In this manner, a lower tip end of the damping force adjustment valve 180 cooperates with the center bore 164d of the lockout valve 164 to essentially form a needle valve. As such, the damping force adjustment valve 180 is axially movable within the center bore 164d of the lockout valve 164 such that the tip end of the damping force adjustment valve 180 can selectively change a flow area between the center bore 164d and the tip end of the damping force adjustment valve 180.

The upper shaft portion 164b of the lockout valve 164 may include internal threads within the center bore 164d of the lockout valve 164 for securing the second actuating member 94 thereto, as will become more readily apparent below. As such, rotation of the second actuating member 94 causes the lockout valve 164 to rotate therewith.

The lower shaft portion 164c of the lockout valve 164 supports the damping piston 162 together with the check valve 190 and the shim stack valve 192. In particular, a lower end of the lower shaft portion 164c of the lockout valve 164 includes an external thread for threadedly receiving a nut 196.

According to certain exemplary embodiments, the lockout piston 166 includes a piston portion 166a and a shaft portion 166b. The piston portion 166a includes an annular seal or O-ring disposed between its outer peripheral surface and an internal surface of the upper telescopic member 26 to create a seal therebetween. The piston portion 166a may include a plurality of main fluid flow ports (e.g., three main fluid flow ports) 166c, a plurality of blow ports (e.g., six blow ports) 166d and a plurality of return ports (e.g., eighteen return ports) 166e. The main fluid flow ports 166c may be arranged about the piston portion 166a, such as arranged in a circumferential manner around the piston portion 166a with each of the areas between the main fluid flow ports 166c including, for instance, two blow ports 166d. The main fluid flow ports 166c may be axially arranged and configured to extend between upper and lower axial end faces of the piston portion 166a. The blow ports 166d extend at an angle with respect to a center axis of the lockout piston 166 to enable the blow ports 166d to extend between the upper and lower axial end faces of the piston portion 166a. The return ports 166e are arranged, such as in three groups of six ports 166e with one of the groups of return ports 166e being located radially outward from a corresponding one of main fluid flow ports 166c. The return ports 166e may extend at an angle with respect to a center axis of the lockout piston 166 so that the return ports 166e can extend between the lower axial end face of the piston portion 166a and one of the main fluid flow ports 166c.

As previously described, the lockout valve 164 prevents fluid from flowing through the damping piston 162 when in a lockout mode; however, when the lockout valve 164 is in one or more non-lockout modes, the axial fluid flow passages 194 enable the fluid flow ports 166c of the damping piston 162 to be axially aligned with the fluid flow ports 166c of the lockout valve 164. A flow direction of fluid through the damping piston 162, the lockout valve 164, and the lockout piston 166 during compression of the suspension 12 is primarily axially upward when the damping lockout mechanism is in a non-lockout mode. Accordingly, a directional flow of fluid through the damping piston 162, the lockout valve 164, and the lockout piston 166 does not reverse its axial direction. Likewise, a directional flow of fluid through the damping piston 162, the lockout valve 164, and the lockout piston 166 does not extend in a primarily radial direction at any point through the damping piston 162, the lockout valve 164, and the lockout piston 166. Such a substantially linear (e.g., axial) flow path of fluid through the damping piston 162, the lockout valve 164, and the lockout piston 166 effectively prevents unnecessary damping effects from occurring at a flow path through the damping piston 162, the lockout valve 164, and the lockout piston 166.

According to exemplary embodiments, the return valve 168 may be disposed between the main body portion 164a of the lockout valve 164 and the piston portion 166a of the lockout piston 166. In this manner, the return valve 168 normally closes off the return ports 166e of the lockout piston 166 so that fluid does not normally flow through the return ports 166e of the lockout piston 166. According to one implementation, the return valve 168 may include a return valve plate 168a and a compression spring 168b. The return valve plate 168a normally abuts a lower end of the lockout piston 166 by the compression spring 168b to normally close off the return ports 166e. It is noted; however, that during rebound of the suspension 12 when in a lockout mode, fluid in the lower internal chamber 184 forces the return valve plate 168a away from a lower end of the lockout piston 166 to open the return ports 166e and, thereby, enables fluid to flow therethrough. As such, the return valve 168 selectively enables fluid communication between the upper internal chamber 182 and the lower internal chamber 184 through the return ports 166e during rebound of the suspension 12. Furthermore, the return ports 166e may serve to bias the lockout piston 166 when the suspension 12 rebounds while in the lockout mode.

The blow-off mechanism 170 normally abuts an upper end of the lockout piston 166 to close off the blow ports 166d. In this manner, the blow-off mechanism 170 may be provided to include a blow-off valve plate 170a, an abutment plate 170b and a compression spring 170c disposed between the blow-off valve plate 170a and the abutment plate 170b. The blow-off mechanism 170 selectively permits fluid communication between the upper internal chamber 182 and the lower internal chamber 184 through the blow ports 166d. During a normal operating mode of the suspension 12, the blow-off mechanism 170 engages with an upper surface of the lockout piston 166 in order to prevent fluid from flowing through the blow-off mechanism 170. When in a lockout mode, if the suspension 12 is subjected to a sufficiently large enough force to counteract the compression spring 170c, the blow-off mechanism 170 may act as a safety valve to permit the suspension 12 to compress. In response to such forces on the suspension 12 when in the aforementioned lockout mode, sufficient aggregation of fluid pressure acting on blow-off mechanism 170 from the lower internal chamber 184 will open the blow ports 166d to enable fluid flow through the blow ports 166d into the upper internal chamber 182.

According to various embodiments, the shaft portion 166b of the lockout piston 166 may be integrally formed with the piston portion 166a of the lockout piston 166 as a one-piece, e.g., unitary, member. An upper end of the shaft portion 166b of the lockout piston 166 may be threaded to the upper support member 176 so that the lockout piston 166 remains stationary with respect to the upper telescopic member 26.

The first shock absorber unit 22 also includes the free piston 172 axially slidable on the shaft portion 166b of the lockout piston 166. It is noted, however, that the free piston 172 is normally held by fluid pressure within the lower internal chamber 184 against the compression spring 174. When the suspension 12 is compressed, fluid pressure in the upper internal chamber 182 of the upper telescopic member 26 increases to compress the compression spring 174 such that an area of the upper internal chamber 182 increases. During rebound, fluid pressure in the upper internal chamber 182 of the upper telescopic member 26 decreases and the compression spring 174 moves the free piston 172 back to its normal resting position (or state). According to certain embodiments, the free piston 172 has an annular seal or O-ring disposed between its outer peripheral surface and an internal surface of the upper telescopic member 26 to create a seal therebetween. Also, the free piston 172 may have an inner sealing arrangement between its inner peripheral surface and an outer surface of the shaft portion 166b of the lockout piston 166 so as to create a seal therebetween. As such, an uppermost space of the upper telescopic member 26 above the free piston 172 may be isolated from the upper internal chamber 182 of the upper telescopic member 26.

Upper support member 176 includes a stepped center bore with a lower bore portion 176a with an internal thread, a middle bore portion 176b with an annular seal or O-ring, and an upper bore portion 176c having a respectively larger diameter than respective diameters of portions 176a and 176b. Upper support member 176 is threaded into the upper body member 178 so as to be fixed to an upper end of the upper telescopic member 26. An annular seal or O-ring is disposed between its outer peripheral surface and an internal surface of the upper body member 178 to create a seal therebetween. Also, an annular seal or O-ring can be disposed between its outer peripheral surface and an internal surface of the upper body member 178 to create a seal therebetween. An upper end of the shaft portion 166b of the lockout piston 166 is threaded into the lower bore portion 176a of the upper support member 176 so as to be fixed to the upper end of the upper telescopic member 26. In this manner, the upper bore portion 176c of the upper support member 176 rotatably supports part of the second actuating member 94, as will be described in more detail below.

According to exemplary embodiments, the upper body member 178 is threaded into an upper end of the upper telescopic member 26 with an annular seal or O-ring disposed between its outer peripheral surface and an internal surface of the upper telescopic member 26 so as to create a seal therebetween. The upper body member 178 has a stepped center bore with a lower bore portion 178a including an internal thread, a middle bore portion 178b having an internal thread, and an upper bore portion 178c having a plurality of indexing recesses. The upper body member 178 also has an annular recess 178d in an upper surface with annular recess 178d coaxially surrounding the upper bore portion 178c. A plurality of curved slots (e.g., two curved slots) 178e are formed in the upper body member 178 so that the lower bore portion 178a can communicate with the annular recess 178d. It is noted that the curved slots 178e may be arcuately shaped slots having center points located on a center axis of the stepped center bore of the upper body member 178. The upper bore portion 178c and the annular recess 178d form an upper shaft portion 178f having an external thread that threadedly receives the first actuating member 38 therein.

The damping force adjustment valve 180 has an upper end coupled to the first actuating member 38 so that operation of the first actuating member 38 causes the damping force adjustment valve 180 to move in an axial direction. For instance, an upper end of the damping force adjustment valve 180 is externally threaded and, thereby, threadedly engaged with an internal thread of the middle bore portion 178b of the upper body member 178. Accordingly, when the first actuating member 38 is rotated, the damping force adjustment valve 180 is also rotated, but the damping force adjustment valve 180 also moves in an axial direction due to engagement of the external thread of the internal thread of the middle bore portion 178b of the upper body member 178. Axial movement of the damping force adjustment valve 180 enables selective adjustment of a fluid flow rate of fluid from the lower internal chamber 184 to the upper internal chamber 182. As such, a lower tip end of the damping force adjustment valve 180 cooperates with the center bore 164d of the lockout valve 164 to form, in essence, a needle valve.

In the illustrated embodiment, the first and second actuating members 38 and 94 are capable of mutually exclusive actuation such that the damping force adjustment valve 180 can remain in a set position when the second actuating member 94 is operated (e.g., rotated) between a lockout position (or state) corresponding to a non-damping or lockout mode and an unlocked position (or state) corresponding to a normal damping or operating mode. Furthermore, the first and second actuating members 38 and 94 are both rotatably mounted to the upper body member 178 about a common center axis of the upper telescopic member 26. In this manner, the first actuating member 38 is disposed within the second actuating member 94 so that the second actuating member 94 can rotate about the first actuating member 38.

According to exemplary embodiments, the first actuating member 38 includes a pulley portion 38a, a shaft portion 38b, a spring 38e, a ball detent 38d and an internally threaded cap 38e. The spring 38c and the ball detent 38d are located in a radially extending bore of the shaft portion 38b, such that the ball detent 38d is biased against an annular inner surface of the upper body member 178. An inner surface of the upper body member 178 has a plurality of recesses 178g (only two of which are illustrated) that selectively engage with the ball detent 38b to provide individual adjustment points for controlling a clamping rate for the adjustment unit 34. As such, an indexing arrangement is formed by the shaft portion 38b, the spring 38c, the ball detent 38d, and recesses 178a. The shaft portion 38b of the first actuating member 38 has a lower end thereof including a non-circular cross section disposed in a non-circular bore of an upper end of the damping force adjustment valve 180. The pulley portion 38a is fixedly mounted to an upper end of the shaft portion 38b of the first actuating member 38 by, for example, a set screw, pin, or other suitable fixing mechanism. In this manner, rotation of the first actuating member 38 causes the damping force adjustment valve 180 to rotate therewith. It is noted that an internally threaded cap 38e may be threaded onto the upper body member 178. When internally threaded cap 38e is threaded onto the upper body member 178, the shaft portion 38b of the first actuating member 38 is prevented from moving upwardly such that a lower end of the shaft portion 38b can remain disposed within the aforementioned non-circular bore of the upper end of the damping force adjustment valve 180. Since the pulley portion 38a is fixedly mounted to an upper end of the shaft portion 38b, the internally threaded cap 38e may also act to retain the pulley portion 38a of the first actuating member 38 to the damping force adjustment valve 180.

In certain exemplary embodiments, the second actuating member 94 includes a portion 94a and a control rod 94b. The portion 94a and the control rod 94b are interconnected via a plurality of pins 94c so that the portion 94a and the control rod 94b can rotate together as a unit, such as in response to actuation of the control cable 46.

Averting back to FIG. 6, a lower damping unit 198, according to various exemplary embodiments, includes the lower seal member (or damping piston) 126, the tube (or connecting rod) 128, a sealing member 200, and a damping force adjustment valve 202. It is noted that the lower damping unit 198 becomes immovable in the lockout mode due to the free piston 172 becoming immovable in response to a lock-out operation essentially characterized by a scenario where dampening fluid can no longer flow through the damper adjustment unit 106a. The lower damping unit 198 may be any suitable damping mechanism and, therefore, is not described or illustrated in any further detail. It is noted, however, that the damping piston 126 is held stationary with respect to the lower portion 28 of the first shock absorber unit 22 and, thereby, slidably contacts internal surface of the upper telescopic member 26. As previously described, the damping piston 126 includes axially extending the fluid flow ports 134 configured to provide a damping effect. The connecting rod 128 is, in exemplary embodiments, a hollow rod that fixedly attaches the damping piston 126 to a bottom end of the lower portion 28. In this manner, an interior cavity region 128a of the connecting rod 128 is sealed at its upper and lower ends so as to form an air tight chamber. As previously described, the lower seal member 126 forms a seal between an upper end of the connecting rod 128 and the internal surface 130 of the upper telescopic member 26. The sealing member 200, however, is held stationary with respect to the lower portion 28 and slidably contacts the internal surface of the upper telescopic member 26. In this manner, the damping force adjustment valve 202 is disposed in an upper end of the connecting rod 128 in order to regulate a fluid flow rate passing from above the damping piston 126 to the lower cavity 138 below the damping piston 126. A lower damping control unit 204 is configured and arranged to move the damping force adjustment valve 202 in an axial direction and, thus, to regulate the fluid flow rate.

FIGS. 15A-15C and 16A-16C schematically illustrate processes for controlling the suspension 12 via the control unit 14, according to exemplary embodiments. It is noted that the previously described components of the suspension 12 are shown in block diagram form in order to avoid unnecessarily obscuring the proceeding description. Referring to FIGS. 15A-15C with continued reference to FIGS. 3-14, the control unit 14 may be configured to provide three sequential operating modes for the suspension 12, such as a "long" stroke mode (or mode) 1501 shown in FIG. 15A, "short" stroke mode (or mode) 1503 shown in FIG. 15B, and "locked-out" mode (or mode) 1505 shown in FIG. 15C. It is contemplated, however, that one or more intermediary modes may be provided between modes 1501 and 1503 and/or between modes 1503 and 1505.

In the mode 1501, the control unit 14 may be in a first state and, as such, a slack 46e may be present in a portion 46d of the control cable 46. Accordingly, when the control unit 14 is manipulated (e.g., the lever portion 56 is, for example, pushed) to actuate the suspension adjusting mechanism 36 to the mode 1503, the pulley 40 will rotate, such as in a clockwise fashion about the rotational axis 50, such that the slack 46e in the portion 46d of the control cable 46 will be decreased (or removed) and the biasing member 90 will be stretched as the second anchoring portion 88 of the pulley 40 is rotated away from the anchoring bracket 92. In this manner, the biasing member 90 will bias the pulley 40 towards the mode 1501. Accordingly, such rotation of the pulley 40 about the rotational axis 50 drives the shaft 152 of the stroke adjustment unit 150 to shorten a stroke length of the suspension 12. As such, intermediary modes between the modes 1501 and 1503 may be provided for fine tuning a stroke length between the "long" stroke mode 1501 and the "short" stroke mode 1503. It is noted that if the control unit 14 is actuated to return the suspension 12 to the mode 1501 from the mode 1503 (e.g., the releasing mechanism 58 is, for instance, depressed), a biasing force of the biasing member 90 will return the pulley 40 to the mode 1501.

According to exemplary embodiments, if the control unit 14 is manipulated to actuate the suspension 12 between the modes 1503 and 1505 (e.g., the lever portion 56 is, for example, pushed further), both of the adjusting mechanisms 34 and 36 will be actuated, e.g., will be rotated, such that both of the pulleys 38 and 40 will be rotated in clockwise fashions about the respective rotational axes 48 and 50. Subsequently, rotation of the pulley 38 engages the second actuating member 94, such that both the pulley 38 and the second actuating member 94 will rotate to the mode 1505. In this manner, rotation of at least the pulley 38 torques the biasing member 96 to effectively bias at least the pulley 38 to the mode 1503. As such, intermediary modes between the modes 1503 and 1505 may be provided for fine tuning a dampening characteristic of the damper adjustment unit 22. Accordingly, rotation of the pulley 38 and the second actuating member 94 to the mode 1505 drives the lockout valve 164 to "lockout" the damper adjustment unit 22. Once the damper adjustment unit 22 is "locked out," subsequent rotation of the pulley 40 will no longer affect changes to a stroke length of the suspension 12 (that is, until the damper adjustment unit 22 is "unlocked") while the further rotation of the pulley 40 torques the biasing member 90 to effectively bias the pulley 40 to the mode 1503. It is noted that if the control unit 14 is actuated (e.g., the releasing mechanism 58 is, for instance, depressed) to return the suspension 12 to the mode 1503 from the mode 1505, a biasing force of the biasing member 96 will return the pulley 38, and thereby the actuating member 94 to the mode 1503.

Second Embodiment

Figure 16A:
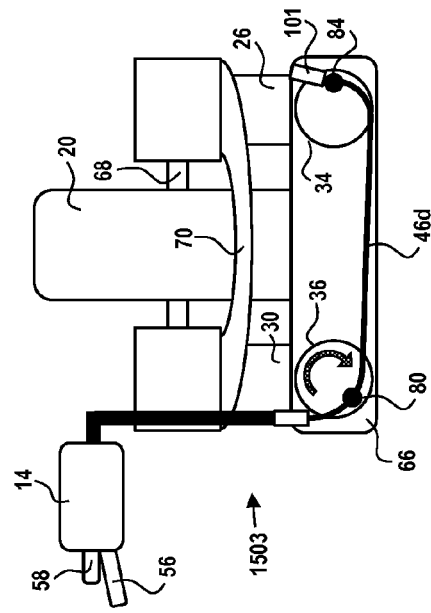
Figure 16B:
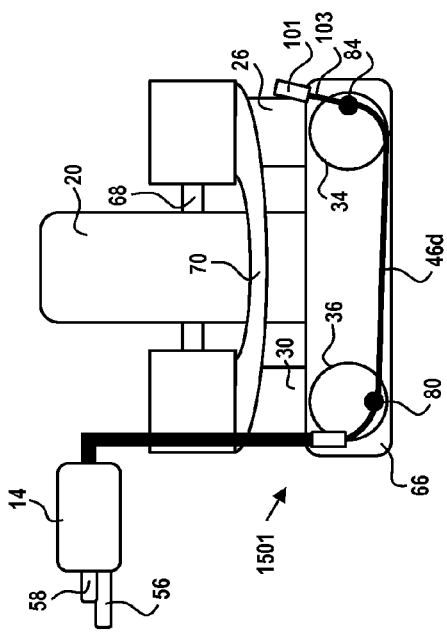
Figure 16C:
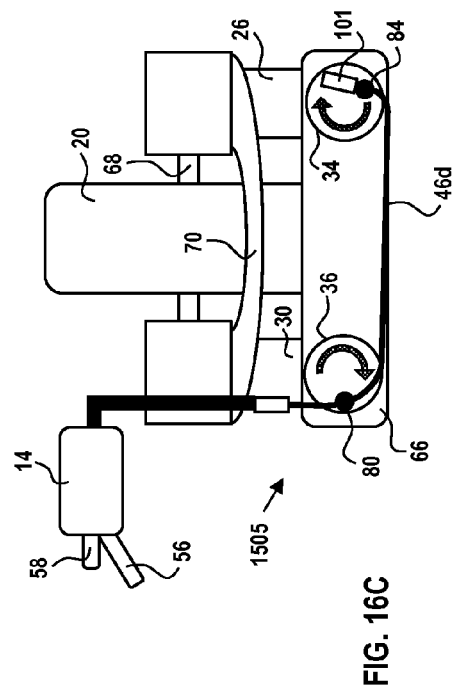

Referring to FIGS. 16A-16C, the control unit 14 and the suspension 12 operate as described with respect to FIGS. 15A-15C; however, one or more of the biasing members 90 and 96 may be replaced by the biasing member 101. Accordingly, when the control unit 14 is manipulated to actuate the suspension adjusting mechanism 36 to the mode 1503, the pulley 40 will rotate, such as in a clockwise fashion about the rotational axis 50, such that the control cable 46 will slide with respect to the coupling mechanism 84 and the biasing member 101 will be drawn towards and abut against the coupling mechanism 84. Since a compression spring 103 will resist compounding as the biasing member 101 is drawn towards the coupling mechanism 84, the biasing member 101 can bias the pulley 40 to the mode 1501 shown in FIG. 16A. If the control unit 14 is manipulated to actuate the suspension 12 between the modes 1503 shown in FIG. 16B and 1505 shown in FIG. 16C (e.g., the lever portion 56 is, for example, pushed further), both of the adjusting mechanisms 34 and 36 will be actuated, such that both of the pulleys 38 and 40 will be rotated in clockwise fashions about the respective rotational axes 48 and 50. In this manner, the biasing member 101 will remain abutted against the coupling mechanism 84 while the control cable 46 is kept slid with respect to the coupling mechanism 84 and, in this state (the mode 1503), when the control cable 46 is further slid, the biasing member 101 can bias the pulleys 38 and 40, as well as the actuating member 90 to the mode 1505.

According to certain other embodiments, one or both of the adjustment pulleys 38 and 40 may be biased, respectively, relative to their aforementioned rotational positions via the biasing member 101 coupled to a distal end of the control cable 46 via the compounding spring 103, as can be seen in FIGS. 16A-16C. In this manner, as one or more of the adjustment pulleys 38 and 40 are actuated (e.g., rotated) via the control unit 14, biasing member 101 may be drawn towards and abut against coupling mechanism 84. Since biasing member 101 will resist compounding as a tension in the control cable 46 increases, biasing member 101 can bias one or more of the adjustment pulleys 38 and 40 to, for instance, one or more of the aforementioned operating states, such as about respective rotational axes 48 and 50.

Third Embodiment

According to another embodiment, the damper adjustment unit 24 may be modified to corresponding to a damper adjustment unit 1122, as seen in FIGS. 17-19. In this embodiment, the damper adjustment unit 1122 is used with the suspension 12 by substituting the damper adjustment unit 24, discussed above, with the damper adjustment unit 1122. The damper adjustment unit 1122 is identical to the damper adjustment unit 24 of the suspension 12, except that a modified damping adjustment unit 1106 is used in place of the damper adjustment unit 1122. As such, the actuating member 38 is utilized to regulate a damping force of the modified damper adjustment unit 1106 and to lockout the modified damper adjustment unit 1106 in a same manner as previously described. In view of these similarities, the components of this embodiment that are identical to the components of the previously described embodiments are given the same reference numerals as the components of the previously described embodiments. Moreover, the descriptions of the components of this embodiment that are identical to the components of the previously described embodiments may be omitted for the sake of brevity.

Accordingly, the components of the modified damping adjustment unit 1106 that are different from the damping adjustment units 106a and 106b include a modified lockout valve 1164, a modified lockout piston 1166, a modified return valve 1168, and a modified blow-off valve 1170. In this exemplary embodiment, the damping adjustment unit 1106 is axially shorter than the damping adjustment units 106a and 106b because the modified blow-off valve 1170 utilizes a shim stack that includes a pair of blow-off valve shims 1170a with a pair of arcuately shaped preset valve members 1170b disposed between the blow-off valve shims 1170a (instead of a coil spring in a conventional blow-off valve). A nut 1170c holds the blow-off valve shims 1170a and the preset valve members 1170b in place against the modified lockout piston 1166. The preset valve members 1170b are configured and arranged to change an amount of fluid pressure needed to flex the blow-off valve shims 1170a so as to enable fluid to flow through the modified lockout piston 1166. In this manner, the preset valve members 1170b elastically deform the upper one of the blow-off valve shims 1170a. Because of the use of the modified blow-off valve 1170, minor changes are also implemented to the modified lockout valve 1164, the modified lockout piston 1166, and the modified return valve 1168 with respect to the previously described embodiments.

The modified lockout valve 1164 and the modified lockout piston 1166 are essentially the same as the lockout valve 164 and the modified lockout piston 166, except that the number and arrangements of the ports and passages has changed to accommodate the modified blow-off valve 1170. For example, as seen in FIG. 18, the modified lockout piston 1166 has only two fluid flow passages; however, the overall function and operation of the modified damping adjustment unit 1106 is the same as the damping adjustment units 106a and 106b, as discussed above.

As seen in FIGS. 17-19, the modified lockout piston 1166 is essentially the same as the lockout piston 166, except that the modified lockout piston 1166 is a two piece structure and only utilizes a pair of two fluid flow passages. It is noted that the modified lockout piston 1166 basically includes a piston portion 1166a and a shaft portion 1166b that is separate from the piston portion 1166a. The piston portion 1166a has an annular seal or O-ring disposed between its outer peripheral surface and an internal surface of an upper telescopic member 1126 to create a seal therebetween. In certain embodiments, the piston portion 1166a includes two main fluid flow ports 1166e, a plurality of blow ports 1166d (e.g., four blow ports), and a plurality of return ports 1166e (e.g., four return ports). Main fluid flow ports 1166c are axially arranged and extend between upper and lower axial end faces of the piston portion 1166a.

It is also noted that the adjustment unit 34 may positioned at a top portion of the upper telescopic member 1126 and may be operatively coupled to the lockout valve 164 and the damping force adjustment valve 180. In this embodiment, however, the actuating members 38 and 94 may rotate about the rotational axis 48 as a single unit and, therefore, the modified lockout value 1164 and the damping force adjustment valve 180 may rotate together.

An exemplary operation of the suspension 12 including the modified damper adjustment unit 1122 is described with respect to FIGS. 20A-1 through 20C-2. In this implementation, one of the biasing members 90 and 96 may not be utilized (however, may be used if desired). As such, the control unit 14 may be configured to provide three operating modes for the suspension 12 including the modified damper adjustment unit 1122, such as a "long" stroke mode (or mode) 2001 shown in FIG. 20A-1 and FIG. 20A-2, a "short" stroke mode (or mode) 2003 shown in FIG. 20B-1 and FIG. 20B-2, and a "locked-out" mode (or mode) 2005 shown in FIG. 20C-1 and FIG. 20C-2. It is contemplated, however, that one or more intermediary modes may be provided between the modes 2001 and 2003 and/or between the modes 2003 and 2005.

In the mode 2001, the control unit 14 may be in a first state; however, the portion 46d of the control cable 46 is taut between the coupling mechanisms 80 and 84 and the main fluid flow ports 1166c are in an open state, as shown in FIG. 20A-1 and FIG. 20A-2. Accordingly, when the control unit 14 is manipulated (e.g., the lever portion 56 is, for example, pushed) to actuate the suspension 12 to the mode 2003, both of the pulleys 38 and 40 will rotate, such as in a clockwise fashion about the respective rotational axes 48 and 50. As such, rotation of the pulley 40 about the rotational axis 50 drives the shaft 152 of the stroke adjustment unit 150 to shorten a stroke length of the suspension 12, whereas the rotation of the pulley 38 drives the modified lockout valve 1164. It is noted, however, that the main fluid flow ports 1166c will remain open despite the driving of the modified lockout valve 1164 to the mode 2003, as can be seen in FIG. 20B-1 and FIG. 20B-2. It is noted that if the control unit 14 is actuated to return the suspension 12 to the mode 2001 from the mode 2003 (e.g., the releasing mechanism 58 is, for instance, depressed), a biasing force of either biasing member 90 or 96 will return the pulleys 38 and 40 to the mode 2001.

If the control unit 14 is manipulated further to actuate the suspension 12 between the modes 2003 and 2005 (e.g., the lever portion 56 is, for example, pushed further), both of the adjusting mechanisms 34 and 36 will be actuated, e.g., will be rotated, such that the pulleys 38 and 40 will be rotated in clockwise fashions about the respective rotational axes 48 and 50. At the mode 2005, however, rotation of the pulley 38 and, thereby, also of the actuating member 94 will drive the modified lockout valve 1164 to "lockout" the damper adjustment unit 1122. That is, the main fluid flow ports 1166c will be closed off, as shown in FIG. 20C-1 and FIG. 20C-2. Once the modified damper adjustment unit 1122 is "locked out," subsequent rotation of pulley 40 will no longer affect changes to a stroke length of the suspension 12 (that is, until the modified damper adjustment unit 1122 is "unlocked"). As such, if the control unit 14 is actuated (e.g., the releasing mechanism 58 is, for instance, depressed) to return the suspension 12 to the mode 2003 from the mode 2005, a biasing force of either biasing member 90 or 96 will return the pulley 38 and the actuating member 94 to the mode 2003.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A bicycle suspension comprising:
   a stroke adjustment unit configured to adjust a stroke of the bicycle suspension;
   a suspension damper configured to apply damping force to the bicycle suspension;
   a damper adjustment unit configured to adjust the damping force applied by the suspension damper;
   a control mechanism operatively coupling the stroke adjustment unit to the damper adjustment unit, the control mechanism being configured to sequentially adjust the stroke and the damping force;
   a first cable driven pulley configured to actuate the stroke adjustment unit to permit the stroke to be shortened or lengthened, the first cable driven pulley being rotatable about an axis, the first cable driven pulley including an anchoring structure projecting from an outer circumference of the first cable driven pulley; and
   a first biasing member configured to bias the first cable driven pulley, the first biasing member being directly connected to the anchoring portion,
   wherein the stroke adjustment unit includes a shaft having a helically grooved outer circumferential surface that is configured to be rotated in order to drive a cylinder axially within the bicycle suspension to adjust overall stroke length of the bicycle suspension.

2. The bicycle suspension according to claim 1, wherein the control mechanism is configured to have a first state in which the stroke adjustment unit is controlled to provide a first stroke length, a second state in which the stroke adjustment unit is controlled to provide a second stroke length, the second stroke length being shorter than the first stroke length, and a third state in which the damper adjustment unit is controlled to lock the damping force.

3. The bicycle suspension according to claim 2, wherein the control mechanism is configured to sequentially adjust the bicycle suspension from the first state to the second state and from the second state to the third state.

4. The bicycle suspension according to claim 2, further comprising:
   a second cable driven pulley configured to actuate the damper adjustment unit to permit the damping force to be increased or decreased.

5. The bicycle suspension according to claim 4, wherein the first biasing member is configured to bias the first cable driven pulley from the second state of the bicycle suspension toward the first state of the bicycle suspension.

6. The bicycle suspension according to claim 5, wherein the first biasing member is configured to bias both the first cable driven pulley and the second cable driven pulley from the third state of the bicycle suspension toward the second state of the bicycle suspension.

7. The bicycle suspension according to claim 5, further comprising:
   a second biasing member configured to bias the second cable driven pulley from the third state of the bicycle suspension toward the second state of the bicycle suspension.

8. The bicycle suspension according to claim 1, further comprising:
   a first telescopic tube including the stroke adjustment unit and a biasing member configured to expand the first telescopic tube;
   a second telescopic tube including the damper adjustment unit; and
   a connector connecting the first telescopic tube and the second telescopic tube,
   wherein the first telescopic tube and the second telescopic tube expand and contract as a unit.

9. The bicycle suspension according to claim 1, wherein the overall stroke length adjusted by the stroke length adjustment unit is defined as an outermost range of movement of the suspension.

10. The bicycle suspension according to claim 4, further comprising:
    a control cable that extends from the first cable driven pulley to the second cable driven pulley.

11. The bicycle suspension according to claim 7, wherein the first biasing member is a coil spring, and wherein the second biasing member is a torsion spring.

* * * * *